United States Patent [19]

Ishigaki et al.

[11] Patent Number: 5,403,106
[45] Date of Patent: Apr. 4, 1995

[54] LIQUID APPLICATOR WITH AXIALLY SPACED JOINTS

[75] Inventors: Masayuki Ishigaki, Minamikawachi; Tadashi Mukunoki, Toyonaka, both of Japan

[73] Assignee: Kabushiki Kaisha Sakura Kurepasu, Osaka, Japan

[21] Appl. No.: 24,949

[22] Filed: Mar. 2, 1993

[30] Foreign Application Priority Data

Mar. 2, 1992 [JP] Japan .............................. 4-020023 U

[51] Int. Cl.⁶ .......................... B43K 15/00; B43K 8/02; B32B 31/16
[52] U.S. Cl. ..................................... 401/198; 401/199; 401/251; 156/73.1
[58] Field of Search ........................ 401/198, 199, 251; 156/73.1

[56] References Cited

U.S. PATENT DOCUMENTS

| | | | |
|---|---|---|---|
| 3,659,953 | 5/1972 | Taylor | 401/198 |
| 3,827,925 | 8/1974 | Douglas | 156/73.1 |
| 3,836,062 | 9/1974 | Tsunoda et al. | 228/1 |
| 3,934,746 | 1/1976 | Lilja | 215/247 X |
| 4,003,665 | 1/1977 | Dreyer et al. | 401/259 |
| 4,175,590 | 11/1979 | Grandclement | 137/883 |
| 4,302,120 | 11/1981 | Ligouri | 401/198 |

FOREIGN PATENT DOCUMENTS

| | | | |
|---|---|---|---|
| 274960 | 7/1988 | European Pat. Off. | 401/198 |
| 1275001 | 9/1961 | France | 156/73.1 |
| 1400426 | 4/1965 | France | 401/198 |
| 2359348 | 2/1978 | France . | |
| 1511405 | 7/1969 | Germany | 401/198 |
| 7206781 | 7/1973 | Netherlands | 156/73.1 |
| 9104873 | 4/1991 | WIPO | 401/199 |

OTHER PUBLICATIONS

Branson Technical Information PW-3 Aug. 1980.
French Search Report dated Jan. 28, 1994.

*Primary Examiner*—Steven A. Bratlie
*Attorney, Agent, or Firm*—Fish & Richardson

[57] ABSTRACT

First, second, and third bottom stepped portions 18, 20, 22 are formed stepwise at a lead end portion of a casing 10 of a liquid applicator. First, second, third, and fourth lead stepped portions 32, 34, 36, 38 are formed stepwise at a bottom end portion of a lead portion 12 of the liquid applicator. Lead end faces 24, 26 of the second and third bottom stepped portions 20, 22 are adhered with bottom end faces 40, 42 of the second and third lead stepped portions 34, 36 by means of an ultrasonic adhesion in a state where the respective bottom stepped portions are brought into contact with the corresponding lead stepped portions. Accordingly, the adhered faces are prevented from coming apart at each adhered portion in the liquid applicator including lead and bottom side shafts which are coupled with each other by means of ultrasonic adhesion.

24 Claims, 8 Drawing Sheets

LIQUID APPLICATOR WITH AXIALLY SPACED JOINTS

BACKGROUND OF THE INVENTION AND RELATED ART STATEMENT

This invention relates to liquid applicators including paint markers and ball-point pens particularly to those obtained by coupling a lead side shaft with a bottom side shaft by means of ultrasonic adhesion.

Conventionally, there has been sometimes used an ultrasonic adhesion method in fabricating a liquid applicator as a means for coupling a lead side shaft with a bottom side shaft, for example, for coupling a lead portion with a casing or coupling the casing with a bottom cap.

FIG. 11A shows an example of structure in which casing 80 is coupled with a lead portion 82 in a liquid applicator as described above. In this figure, the hollow cylindrical casing 80 has an outer stepped portion 84 and an inner stepped portion 86 formed radially side by side. A lead end face 85 of the outer stepped portion 84 is located more toward a lead end of the liquid applicator (toward the left side in FIG. 11A) than a lead end face 87 of the inner stepped portion 86. On the other hand, the hollow cylindrical lead portion 82 has first, second, and third stepped portions 88, 90, 92 in this order from a radially outermost one. A bottom end face 95 of the second stepped portion 90 is located more toward a bottom end of the liquid applicator (toward the right side in FIG. 11A) than a bottom end face 94 of the first stepped portion 88. A bottom end face 96 of the third stepped portion 92 is located more toward the bottom end of the liquid applicator than the bottom end face 95 of the second stepped portion 90.

In a state where the bottom end face 94 of the first stepped portion 88 is substantially in contact with the lead end face 85 of the outer stepped portion 84 or the faces 85, 94 are slightly spaced apart, the lead end face 87 of the inner stepped portion 86 is coupled with the bottom end face 95 of the second stepped portion 90 by means of ultrasonic adhesion. The first stepped portion 88 and the outer stepped portion 84 are formed so as to prevent resin or the like melted by the ultrasonic waves from pouring out.

In the case where an excessive bending load F, for example, as shown in FIG. 11B acts on the liquid applicator main body in the above structure, the casing 80 is lifted from the lead portion 82 about an inner corner 98 of the outer stepped portion 84 which serves as a fulcrum of a lever. Thus, the lead end face 87 of the outer stepped portion 86 and the bottom end face 95 of the second stepped portion 90 coupled by the ultrasonic adhesion are liable to come apart. This leads to a loss of airtightness in the liquid applicator (particularly those of the core type or the free ink type). Accordingly, it has become critical to prevent the loss of airtightness in the interior of the liquid applicator.

In view of the problems residing in the prior art, it is an object of the present invention to provide a liquid applicator having lead and bottom side shafts coupled with each other by means of ultrasonic adhesion which is capable of preventing adhered faces from being separated at an adhered portion, and a fabricating method thereof.

Accordingly, the invention is directed to a liquid applicator consisting essentially of a hollow lead side shaft and a hollow bottom side shaft coupled with the lead side shaft in an axial direction of the liquid applicator. The lead side shaft includes a plurality of lead stepped portions arranged side by side radially of the liquid applicator such that bottom end faces thereof are located at positions different from one another in the axial direction. The bottom side shaft includes a plurality of bottom stepped portions arranged side by side radially of the liquid applicator such that lead end faces thereof are located at positions different from one another in the axial direction and are opposed to the bottom end faces of the corresponding lead stepped portions. At least two of the bottom end faces of the lead stepped portions are adhered with the corresponding lead end faces of the bottom stepped portions by means of ultrasonic adhesion.

With the liquid applicator thus constructed the ultrasonic adhesion is carried out between the plurality of lead and bottom stepped portions which are located at radially and axially different portions on the lead and bottom side shafts. Accordingly, the case where a bending load F as shown in FIG. 11B acts on the liquid applicator, a fulcrum does not concentrate on a single point. Rather, fulcrums exist at a plurality of points. Thus, the burden at the adhered portion accompanied by the action of the bending load is reduced in terms of the strength, preventing the adhered faces from coming apart. If an exceedingly large bending load should act on the liquid applicator to cause the adhered faces to come apart at one adhered portion, the energy of this bending load is absorbed by the above separation and the adhered faces are prevented from coming apart at the other adhered portions. Therefore, the remaining adhered portions are allowed to maintain the coupling of the lead and bottom side shafts and airtightness in the liquid applicator. Of course, the axial adhesion strength can be enhanced by increasing the number of adhered portions.

A method of fabricating the above liquid applicator is preferably such that a projected portion is formed on at least either one of the bottom end face of the lead stepped portion and the lead end face of the bottom stepped portion to be adhered with each other so as to project toward the other end face, and ultrasonic waves are supplied in a state where the projected portion is in contact with the other end face.

According to this fabricating method, the projected portion formed on at least either one of the end faces to be adhered with each other is brought into contact with the other end face. Thus, a contact area when the ultrasonic waves are supplied is reduced compared to a case where flat end faces are directly brought into contact with each other without providing the projected portion. The energy of the supplied ultrasonic waves are concentrated on a contact portion between the projected portion and the corresponding end face. This provides a larger ultrasonic melting effect, with the result that a greater adhesion strength against a bending force is obtainable.

It is further preferable to differ a bending adhesion strength (i.e., a minimum bending load which causes the separation of the adhered faces when the bending load acts on the liquid applicator) between the bottom end face of the lead stepped portion and the lead end face of the bottom stepped portion at the respective adhered portions.

In this arrangement, the bending adhesion strength between the bottom end face of the lead stepped portion and the lead end face of the bottom stepped portion differs at the respective adhered portions, which increases the probability of separating the adhered faces at the adhered portion having a low bending adhesion strength. This in return prevents the separation of the adhered faces at the adhered portion having a high bending adhesion strength. In other words, the simultaneous separation of the adhered faces at both the adhered portions is prevented actively, thereby protecting the adhered portion having the high bending adhesion strength. As a result, the coupling of the lead and bottom side shafts and the airtightness in the liquid applicator can be maintained satisfactorily with the protected adhered portion.

As a means for differing the bending adhesion strength at the respective adhered portions, the following three arrangements can be considered. According to the first arrangement, two pairs of the lead and bottom stepped portions to be adhered with each other are formed such that the pair whose shortest distance between the adhered faces thereof and a lead end face of the lead side shaft or bottom end face of the bottom side shaft (i.e. a distance to an ultrasonic horn to be placed at an end of the liquid applicator) is shorter than that of the other pair has a larger radial thickness than the other pair. With this arrangement, the pair closer to the ultrasonic horn to be placed has a larger radial thickness. In other words, the pair at which a greater bending adhesion strength is obtainable due to an improved ultrasonic melting effect has a larger radial thickness. Accordingly, a difference in the bending adhesion strength between the pair closer to the ultrasonic horn and the other pair is widened further. Thus, when a large bending load acts on the liquid applicator, the adhered faces are liable to come apart only at the other pair distant from the ultrasonic horn.

According to the second arrangement, a loosely fitting portion to which the projected portion is fitted is formed on the face opposed to the projected portion at the pair of stepped portions having a shorter shortest distance i.e., closer to the ultrasonic horn to be placed, and the ultrasonic waves are supplied in a state where the projected portion is loosely fitted in the loosely fitting portion. With this arrangement, the loosely fitting portion is formed at the end face opposed to the projected portion at the pair of stepped portions which is allowed to obtain a greater bending adhesion strength due to an improved ultrasonic melting effect, and the ultrasonic waves are supplied while the projected portion is loosely fitted in the loosely fitting portion. Accordingly, the bending adhesion strength of the pair closer to the ultrasonic horn becomes further greater than that of the other pair. Thus, when a large bending load acts on the liquid applicator, the adhered faces are liable to come apart only at the other pair distant from the ultrasonic horn.

According to the third arrangement, the two pairs of lead and bottom stepped portions to be adhered are positioned relative to each other such that the opposing end faces of the pair more distant from the ultrasonic horn to be placed than the other pair are spaced apart by a specified distance when the faces of the other pair are in contact with each other. With this arrangement, the opposing end faces are spaced apart at the pair distant from the ultrasonic horn when those are in contact with each other at the pair closer to the ultrasonic horn placed at the end of the liquid applicator. By supplying the ultrasonic waves in this state, an amount of material melted by the ultrasonic wave is greater at the pair closer to the ultrasonic horn than at the pair distant therefrom. Accordingly, a difference in the bending adhesion strength between the pair closer to the ultrasonic horn to be placed and the other pair is widened further. Thus, when a large bending load acts on the liquid applicator the adhered faces are liable to come apart only at the other pair distant from the ultrasonic horn.

Further, either one of the lead side shaft or bottom side shaft may advantageously include outer, intermediate, and inner stepped portions arranged radially from an outermost side while the other shaft may include an auxiliary stepped portion opposed to at least one of the outer and inner stepped portions, and a fit-in stepped portion opposed to the intermediate stepped portion. The intermediate stepped portion is indented from the outer and inner stepped portions to thereby form a recessed portion between the outer and inner stepped portions. The fit-in stepped portion is formed so as to project from the auxiliary stepped portion. At least two pairs of stepped portions are adhered by means of ultrasonic adhesion in a state where the fit-in stepped portion is fitted in the recessed portion.

The above liquid applicator is fabricated by carrying out the ultrasonic adhesion in a state where the fit-in stepped portion is fitted in the recessed portion between the outer and inner stepped portions. This fit-in structure prevents the lead and bottom side shafts from being bent and deformed, thereby reducing the burden on the adhered portions in terms of the strength and preventing the separation of the adhered faces more reliably.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 10:
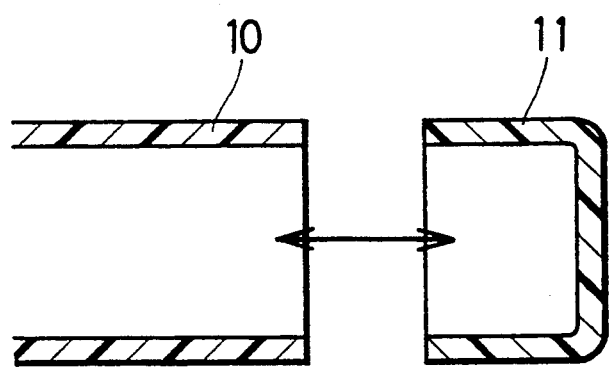
FIG. 10 is a side view showing a casing and a bottom cap coupled with each other.

A first embodiment of the invention will be described with reference to FIGS. 1 and 2. In this embodiment, the invention is applied to coupling of a casing (bottom side shaft) 10 with a hollow lead portion 12 (lead side shaft) 12. However, the invention is not limited to this application, but is applicable to, for example, coupling of a bottom can 11 with a bottom end of the casing 10 as shown in FIG. 10. In this case, the casing 10 is a lead side shaft and the bottom cap 11 is a bottom side shaft.

In the first embodiment, the casing 10 is formed into a container having a bottom end thereof (a right end in FIG. 2) blocked up, whereas the lead portion 12 is formed into a hollow cylindrical figure having open lead and bottom ends. The casing 10 and the lead portion 12 are coupled with each other by means of ultrasonic adhesion to be described later. An ink reservoir 14 is contained in these members 10, 12, and a pen nib 16 is connected with a lead end of the ink reservoir 14. The pen nib 16 projects out of a lead end of the lead portion 12.

Figure 1A:
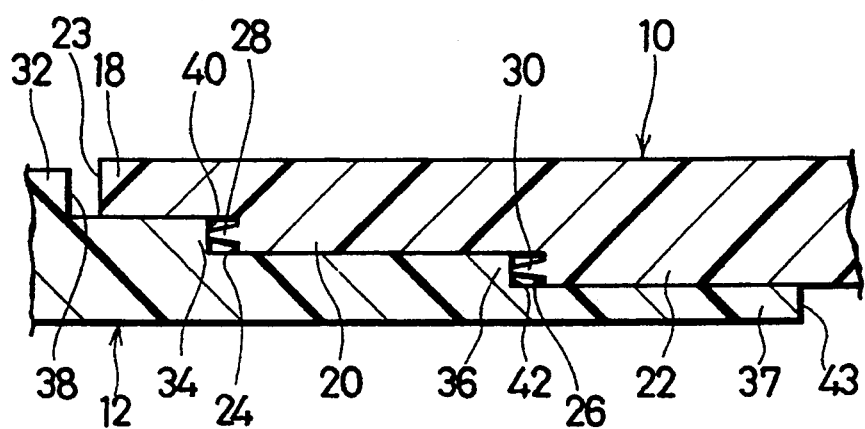
FIG. 1A is sectional view showing a structure of an adhered portion of a casing and a lead portion before ultrasonic waves are supplied in a first liquid applicator embodying the invention.

FIG. 1A shows a structure of an adhered portion of the casing 10 and the lead portion 12 before the ultrasonic adhesion is applied to the applicator.

At a lead end of the casing 10 are formed first, second, and third bottom stepped portions 18, 20, 22 this order from a radially outermost one. A lead end face 24 of the second bottom stepped portion 20 is located more toward the bottom end of the casing 10 (right side in FIGS. 1A and 1B) than a lead end face 23 of the first bottom stepped portion 18. A lead end face 26 of the third bottom stepped portion 22 is located more toward the bottom end of the casing 10 than the lead end face 24 of the second bottom stepped portion 20. On the lead end faces 24, 26 of the second and third bottom stepped portions 20, 22 are formed lines of projection (projected portions) 28, 30 which project toward the lead end of the casing 10 and extend entirely over the circumferences of the respective lead end faces 24, 26.

On the other hand, at a bottom end of the lead portion 12 are formed first, second, third, and fourth lead stepped portions 32, 34, 36, 37 in this order from a radially outermost one. A bottom end face 40 of the second lead stepped portion 34 is located more toward a bottom end of the lead portion 12 than a bottom end face 38 of the first lead stepped portion 32. A bottom end face 42 of the third lead stepped portion 36 is located more toward the bottom end of the lead portion 12 than the bottom end face 40 of the second lead stepped portion 34. A bottom end face 43 of the fourth lead stepped portion 37 is located more toward the bottom end of the lead portion 12 than the bottom end face 42 of the third lead stepped portion 36. Relative positions of the respective stepped portions and projected amounts of the respective projections 28, 30 are set such that lead ends of the projections 28, 30 come to contact with the bottom end faces 40, 42 of the second and third lead stepped portions 34, 36 simultaneously respectively as illustrated and that the lead end face 23 of the first bottom stepped portion 18 is spaced apart from the bottom end face 38 of the first lead stepped portion 32 by a distance greater than the projected amounts of the projections 28, 30 in this state, thereby defining a clearance.

Figure 2:
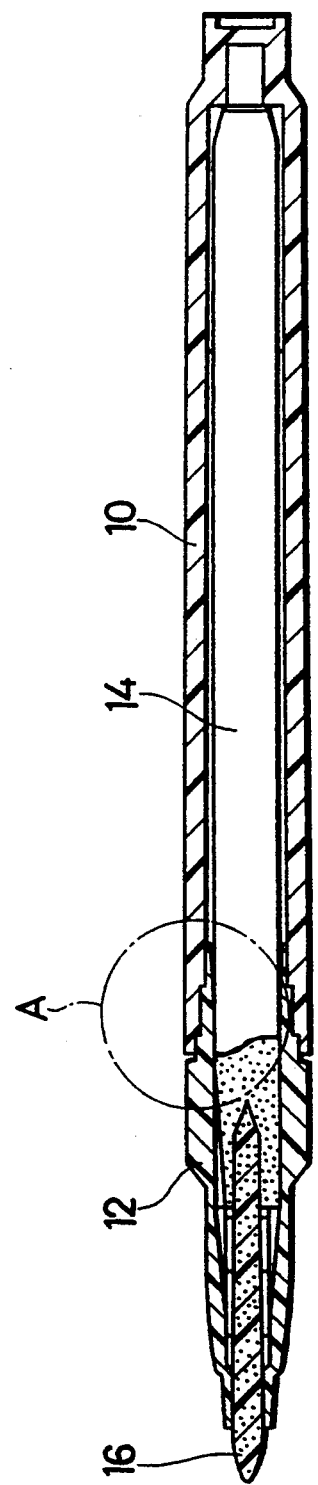
FIG. 2 is an overall sectional view of the liquid applicator.

In a slate shown in FIG. 1A, an ultrasonic horn is paced at and pressed against an end portion of the liquid applicator close to the respective stepped portions, i.e. the lead end of the lead portion 12 shown in FIG. 2. so as to supply ultrasonic waves to the lead portion 12 and the casing 10. Then, a contact portion between the projection 28 and the bottom end face 40 and a contact portion between the projection 30 and the bottom end face 42 are melted by vibration energy of the ultrasonic waves, and thereby the ultrasonic adhesion is carried out at these two points.

It will be appreciated that a known ultrasonic adhering apparatus can be used in carrying out the ultrasonic adhesion, and that various synthetic resins including polypropylene, ABS, AS, polystyrene, polyethylene, polyamide, polyvinyl chloride, and polyacetate are preferably used as a material for the casing 10 and the lead portion 12.

Figure 1B:
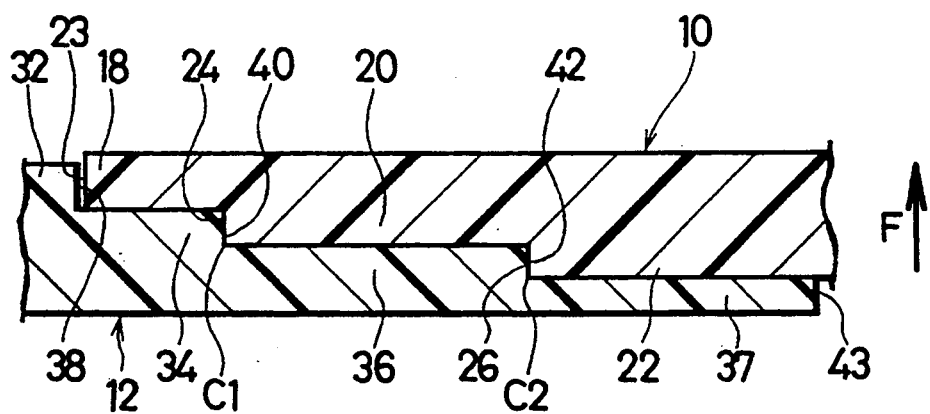
FIG. 1B, enlargedly showing a portion A in FIG. 2, is a sectional view showing a structure of the adhered portion of the casing and the lead portion before the ultrasonic waves are supplied in the liquid applicator.
Figure 11A:
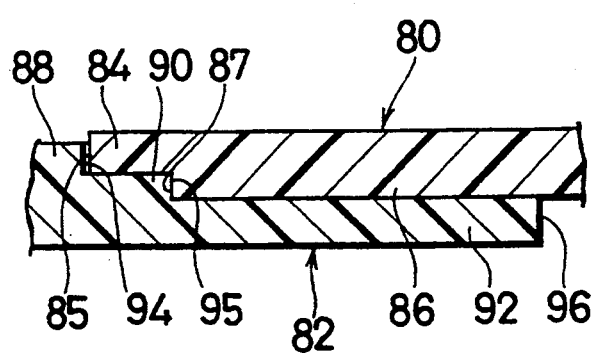
FIG. 11A is sectional view showing a structure of an adhered portion of a casing and a lead portion before ultrasonic waves are supplied in a conventional liquid applicator.
Figure 11B:
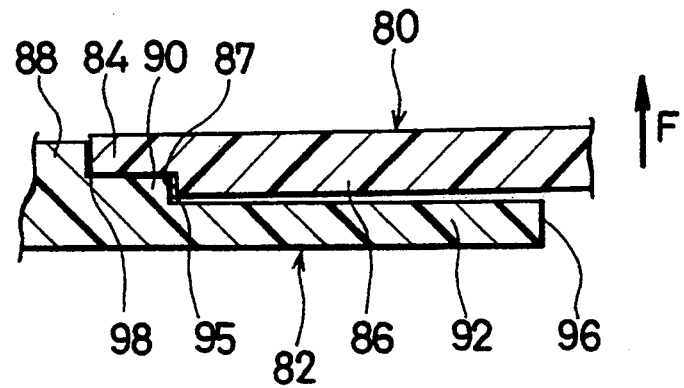
FIG. 11B is a sectional view showing a structure of the adhered portion of a casing and a lead portion before the ultrasonic waves are supplied in the conventional liquid applicator.

According to thus obtained coupled structure, i.e. a structure shown in FIG. 1B, even if a bending load F acts on the liquid applicator main body as shown in this figure, there are two fulcrums about which the casing 10 is lifted upward relative to the lead portion 12 according to the bending load F: a lead angle C1 of the second bottom stepped portion 20 and a lead angle C2 of the third bottom stepped portion 22. The angles C1, C2 are located at axially different positions. Accordingly, compared to the structure in which the adhesion is carried out at the single pair of stepped portions as shown in FIG. 11B, a burden on the respective adhered portions in terms of the strength can be reduced greatly, thereby preventing the adhered faces from coming apart. Even if the bending load F is exceedingly large to cause the adhered faces to come apart at one adhered portion, the adhered faces do not come apart at the other adhered portion since the energy of the bending load F is absorbed to separate the faces at the one adhered portion. Thus, there can be attained at least a minimum level of airtightness in the liquid applicator and coupling between the casing 10 and the lead portion 12.

Figure 3A:
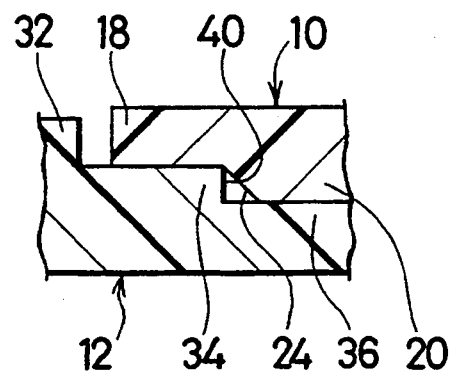
FIGS. 3A. 3B, and 3C are sectional views showing modified adhesion structure of stepped portions in the liquid applicator respectively.
Figure 3B:
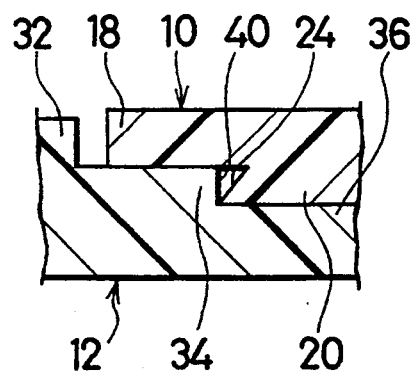
Figure 3C:
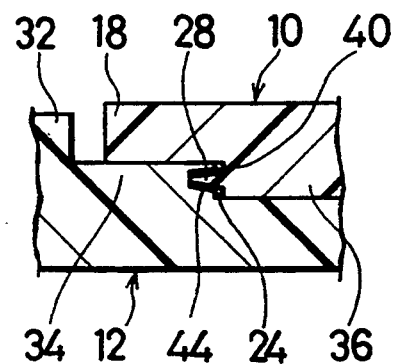

The projections 28, 30 are not necessarily provided at the portions where the ultrasonic adhesion is carried out. These projections 28, 30 may be omitted (i.e., the flat faces are brought into contact with each other), or other suitable form of projections may be formed in place of the projections 28, 30. If the second bottom stepped portion 20 is taken as an example, a projected portion may be formed by shaping the lead end face 24 into an outward or inward facing tapered surface as shown in FIGS. 3A and 3B. With this arrangement, the ultrasonic melting effect can be improved by reducing a contact area of the lead end face 24 with the bottom end face 40 opposed to the lead end face 24. Further, on the bottom end face 40 opposed to the projection 28 may be formed a groove (loosely fitting portion) 44 in which the projection 28 is loosely fittable. If the ultrasonic waves are supplied when the projection 28 is loosely fitted in into the groove 44, a melt of the projection 44 flows into the groove 44 to thereby increase adhesion area and adhesion strength. In addition, this arrangement is capable of preventing the excessive melt from pouring out through clearance between the first lead stepped portion 32 and the first bottom stepped portion 18.

Figure 4:
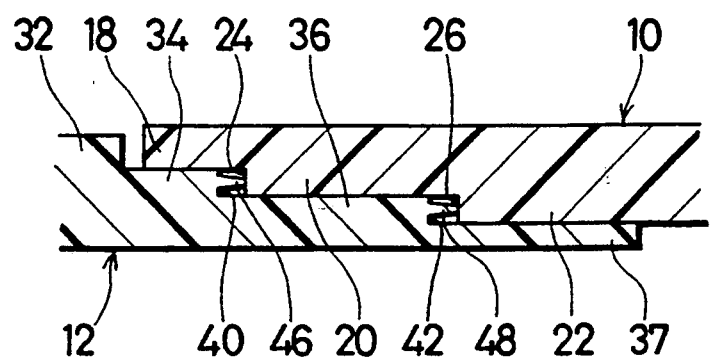
FIG. 4 is a sectional view showing a modification in which projections are formed at bottom end faces of lead stepped portions.

Projected portions such as the projections 28, 30 are not necessarily formed on the casing 10, namely the bottom side shaft. It may be appropriate to form lines of projection 46, 48 projecting toward the bottom end of the liquid applicator from the bottom end faces 40, 42 of the lead portion 12, namely the lead side shaft, as shown in FIG. 4.

Figure 5:
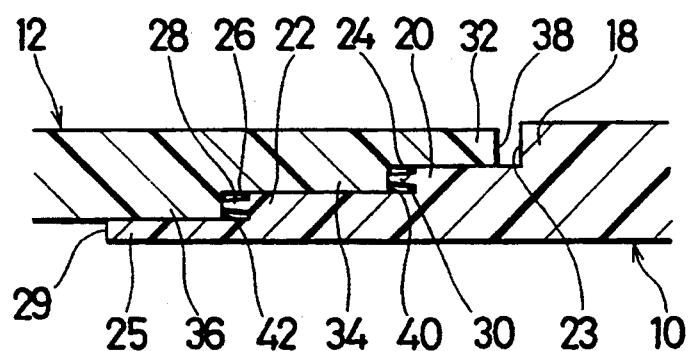
FIG. 5 is sectional view showing a structure of an adhered portion of a casing and a lead portion before ultrasonic waves are supplied in a second liquid applicator embodying the invention.

A second embodiment will be described next with reference to FIG. 5. In the first embodiment, the stepped portions are formed stepwise on the inner circumferential surface of the casing 10 and the outer circumferential surface of the lead portion 12. In the second embodiment, a plurality of stepped portions are formed stepwise on an outer circumferential surface of a casing 10 and an inner circumferential surface of a lead portion 12.

Specifically, on the casing 10, a fourth bottom stepped portion 25 is formed further radially inward of a third bottom stepped portion 22, lead end face 29 of the fourth bottom stepped portion 25 is located more toward the lead end of the casing 10 than a lead end face 26 of a third bottom stepped portion 22. The lead end face 26 of the third bottom stepped portion 22 is located more toward the lead end of the casing 10 than a lead end face 24 of a second bottom stepped portion 20. The lead end face 24 of the second bottom stepped portion 20 is located more toward the lead end of the casing 10 than a lead end face 23 of a first bottom stepped portion 18. On the other hand, the fourth lead stepped portion 37 is omitted from the lead portion 12. A bottom end face 38 of a first lead stepped portion 32 is located more toward a bottom end of the lead portion 12 than a bottom end face 40 of a second lead stepped portion 34. The bottom end face 40 of the second lead stepped portion 34 is located more toward the bottom end of the lead portion 12 than a bottom end face 42 of a third lead stepped portion 36.

In this embodiment, relative positions of the respective stepped portions do not matter particularly. It is sufficient to form these stepped portions at positions different from one another axially and radially.

Figure 6:
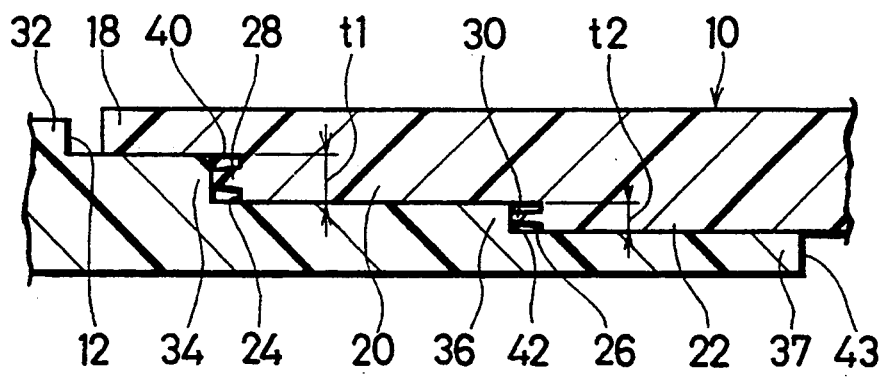
FIG. 6 is sectional view showing a structure of an adhered portion of the casing and the lead portion before ultrasonic waves are supplied in a third liquid applicator embodying the invention.

A third embodiment of the invention will be described next with reference to FIG. 6.

If the first embodiment, the ultrasonic horn is placed at and pressed against an end of the liquid applicator close to the respective stepped portions out of the opposite ends thereof, i.e. the lead end of the liquid applicator to carry out the ultrasonic adhesion. Accordingly, the ultrasonic melting effect is higher at a pair of stepped portion close to the lead end of the liquid applicator (i.e., the second bottom and lead stepped portions 20, 34) than at a pair of the third bottom and lead stepped portions 22, 36 which are distant from the lead end of the liquid applicator. Thus, the former pair generally has a larger bending adhesion strength (a magnitude of a critical bending load which causes the separation of the adhered faces at the adhered portion).

In the third embodiment, a radial thickness t1 of the second bottom and lead stepped portions 20, 34 is set larger than a radial thickness t2 of the third bottom and lead stepped portions 22, 36. Therefore, the bending adhesion strength of the former pair is made further greater than that of the latter pair.

With thus constructed liquid applicator, there is increased the probability that the second bottom and lead stepped portions 20, 34 come apart earlier than the third bottom and lead stepped portions 22, 36 in the case where a relatively large bending load acts on the liquid applicator. In other words, there can be increased the probability of preventing the separation of the adhered faces at the pairs of stepped portions simultaneously. Accordingly, even if the bending load acts, the energy of the bending load is absorbed by the separation of the third bottom and lead stepped portions 22, 36. As a result, the separation of the adhered faces can be prevented more reliably at the pair of second bottom and lead stepped portions 20. 34. Thus, the casing 10 and the lead portion 12 can be coupled with each other suitably and the airtightness in the liquid applicator can be held satisfactorily at the adhered portion between the second bottom and lead stepped portions 20, 34.

Figure 7:
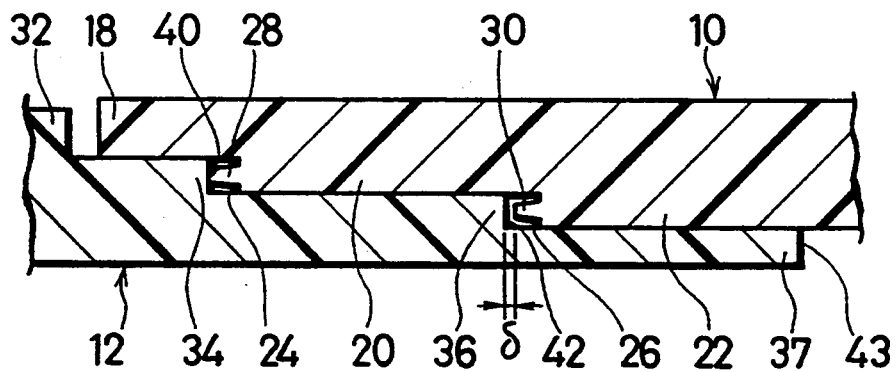
FIG. 7 is sectional view showing a structure of an adhered portion of a casing and a lead portion before ultrasonic waves are supplied in fourth liquid applicator bodying the invention.

There can be considered a variety of means for actively making the bending adhesion strengths different from each other. For example, as shown in FIG. 7 as a fourth embodiment, the positions of the stepped portions 20, 22, 34, 36 and the projected amounts of the projections 28, 30 are set such that the lead end of the projection 30 formed on the third bottom stepped portion 22 is spaced apart from the bottom end face 42 of the third lead stepped portion 36 by a distance δ when the projection 28 formed on the second bottom stepped portion 20 is in contact with the bottom end face 40 of the second lead stepped portion 34. With this arrangement, the bending adhesion strengths are made different since an mount of melted material is reduced by the presence of the clearance δ between the third bottom and lead stepped portions 22, 36. For this purpose, the projections 28, 30 are not necessarily required. Even if these projections are omitted, the stepped portions 20, 22, 34, 36 may be formed such that the lead end face 26 of the third bottom stepped portion 22 is spaced apart from the bottom end face 40 of the second lead stepped portion 36 when the lead end face 24 of the second bottom stepped portion 20 is in contact with the bottom end face 40 of the second lead stepped portion 34.

Figure 8:
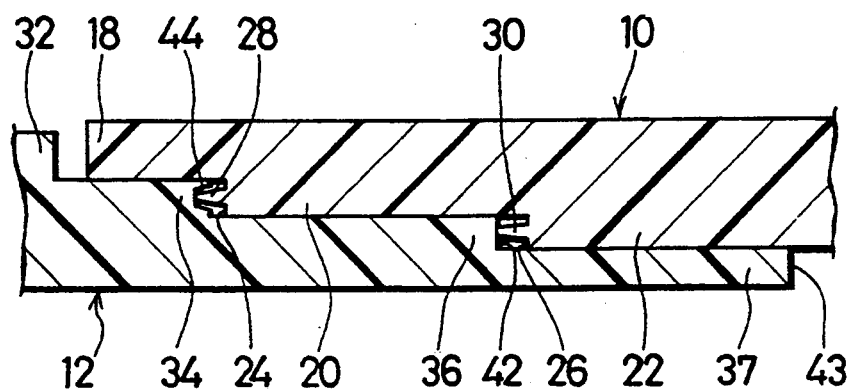
FIG. 8 is sectional view showing a structure of an adhered portion of a casing and a lead portion before ultrasonic waves are supplied in a fifth liquid applicator embodying the invention.

Further as shown as a fifth embodiment in FIG. 8, the groove 44 as shown in FIG. 3B in which the projection 28 is loosely fittable may be formed only on the bottom end face 40 of the second lead stepped portion 34, and the third lead stepped portion 36 may have a simple planar bottom end face 42. With this arrangement, only the bending adhesion strength at the adhered portion between the second lead and bottom stepped portions 34. 20 can be improved because of the presence of the loosely fittable groove.

In the case where the ultrasonic horn is placed at the bottom end of the liquid applicator, specifically, the invention is applied to couple the casing 10 with the bottom cap 11 mounted to the bottom end of the casing 10 as shown in FIG. 10, the effects similar to the aforementioned ones can be obtained if the adhesion strength is improved only at a pair of stepped portions close to the bottom end of the liquid applicator in the second to fourth embodiments.

Figure 9:
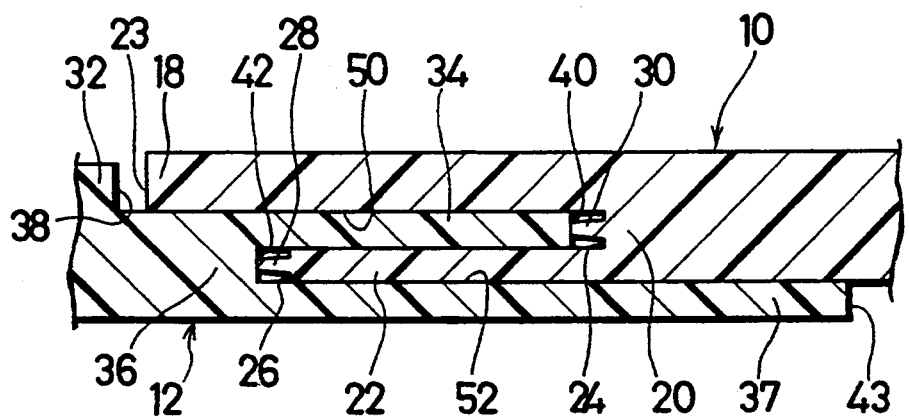
FIG. 9 is sectional view showing a structure of an adhered portion of a casing and a lead portion before ultrasonic waves are supplied in a sixth liquid applicator embodying the invention.

A sixth embodiment of the invention will be described with reference to FIG. 9.

In this figure, at a casing 10, a lead end face of a second bottom stepped portion 20 (serving as both intermediate and auxiliary stepped portions) is located more toward a bottom end of a liquid applicator than lead end faces of 23, 26 of first and second bottom stepped portions (corresponding to outer and inner stepped portions). Accordingly, a groove (recessed portion) 50 extending over an entire circumference is formed between the first and third bottom stepped portions 18, 22.

On the other hand, at a lead portion 12, a bottom end face of a second lead stepped portion (serving as both fitting and outer stepped portions) 34 is located more toward the bottom end of the liquid applicator than bottom end faces 38, 42 of a first lead stepped portion (corresponding to an auxiliary stepped portion) 32 and a third lead stepped portion (serving as auxiliary and intermediate stepped portion). In addition, the bottom end face 42 of the third lead stepped portion 36 is located more toward a lead end of the liquid applicator than the bottom end faces 40, 43 of the second lead stepped portion 34 and a fourth lead stepped portion (corresponding to an inner stepped portion) 37. Accordingly, a groove (recessed portion) 52 extending over an entire circumstance is formed between the second and fourth lead stepped portions 34, 37. In a state where the second lead stepped portion 34 is fitted in the groove 50 and the third bottom stepped portion 22 is fitted in the groove 52, the ultrasonic waves are supplied so as to adhere the bottom and lead end faces 40, 24 of the second lead and bottom stepped portions 34, 20, and the bottom and lead end faces 42, 26 of the third lead and bottom stepped portions 36, 22.

With the above arrangement, by fitting the second lead stepped portion 34 and the third bottom stepped portion 22 into the corresponding grooves, the liquid applicator is prevented from being bent and deformed at the adhered portions between the casing 10 and the lead portion 12. This prevents the separation of the adhered faces at the adhered portions more reliably.

In this embodiment, two fitting portions are provided. However, there may be provided three or more fitting portions, or may be a single fitting portion. For example, it may be appropriate to omit the fourth lead stepped portion 37 shown in FIG. 9 and to fit only the second lead stepped portion 34 into the corresponding groove.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A liquid applicator comprising:
   a lead portion having a hollow bottom end;
   a hollow casing having an axial length longer than said lead portion;
   said lead portion and said hollow casing being coupled with each other in an axial direction of said liquid applicator at a plurality of adhesion portions which are spaced apart in the axial direction, said plurality of adhesion portions including a most leading adhesion portion having greater adhesion strength than any other of said adhesion portions.

2. A liquid applicator according to claim 1 wherein said plurality of adhesion portions are formed by ultrasonic adhesion.

3. A liquid applicator according to claim 2 wherein each of said adhesion portions is on a plane perpendicularly intersecting an axis of said liquid applicator.

4. A liquid applicator according to claim 3 wherein each of said adhesion portions is annular.

5. A liquid applicator according to claim 4 wherein the diameter of said most leading annular adhesion portion is larger than any other of said annular adhesion portions.

6. A liquid applicator according to claim 1 wherein said lead portion and said hollow casing are made of polypropylene.

7. A liquid applicator according to claim 1 wherein said lead portion and said hollow casing are made of polyethylene.

8. A method of fabricating a liquid applicator comprising a lead portion having a hollow bottom end, and a hollow casing having an axial length longer than said lead portion, said lead portion and said hollow casing being coupled with each other in an axial direction of said liquid applicator at a plurality of adhesion portions which are spaced apart in the axial direction, said plurality of adhesion portions including a most leading adhesion portion having greater adhesion strength than any other of said adhesion portions, said method comprising the steps of:
   forming a plurality of stepped portions in a bottom end of said lead portion, side by side in a radial direction of said lead portion to define a plurality of bottom end faces at axially different positions;
   forming a plurality of stepped portions in a lead end of said casing, side by side in a radial direction of said casing to define a plurality of lead end faces at axially different positions, said plurality of lead end faces of said casing corresponding to said plurality of bottom end faces respectively; and
   adhering at least two of each of said plurality of corresponding bottom end and lead end faces by ultrasonic adhesion, such that the most leading adhesion portion has greater adhesion strength than any other of said adhesion portions.

9. The method of claim 8, wherein a most leading bottom end face has a greater area than any other of said bottom end faces, and a most leading lead end face has a greater area than any other of said lead end faces.

10. The method of claim 8, wherein each said bottom end face has a flat surface, and each said lead end face has a projection extending in the axial direction, said projection of a most leading lead end face being longer than said projection of any other of said lead end faces.

11. The method of claim 8, wherein a most leading bottom end face has a recess for receiving a projection, at least one other of said bottom end faces has a flat surface, and each lead end face has a projection extending in the axial direction, said projection of a most leading lead end face extending into said recess formed in said most leading bottom end face of said lead portion.

12. The method of claim 8, wherein each of said plurality of bottom end faces has a flat surface while each of the plurality of lead end faces has a projection extending in the axial direction.

13. A liquid applicator comprising:
   a bottom cap having a hollow lead end;

a hollow casing having an axial length longer than said bottom cap;

said bottom cap and said hollow casing being coupled with each other in an axial direction of said liquid applicator at a plurality of adhesion portions which are spaced apart in the axial direction, said plurality of adhesion points including a most trailing adhesion portion having greater adhesion strength than any other of said adhesion portions.

14. A liquid applicator according to claim 13 wherein said plurality of adhesion portions are formed by ultrasonic adhesion.

15. A liquid applicator according to claim 14 wherein each of said adhesion portions is on a plane perpendicularly intersecting an axis of said liquid applicator.

16. A liquid applicator according to claim 15 wherein each of said adhesion portions is annular.

17. A liquid applicator according to claim 16 wherein the diameter of said most trailing annular adhesion portion is larger than any other of said annular adhesion portions.

18. A liquid applicator according to claim 13 wherein said bottom cap and said hollow casing are made of polypropylene.

19. A liquid applicator according to claim 13 wherein said bottom cap and said hollow casing are made of polyethylene.

20. A method of fabricating a liquid applicator comprising a bottom cap having a hollow lead end, and a hollow casing having an axial length longer than said bottom cap, said bottom cap and said hollow casing being coupled with each other in an axial direction of said liquid applicator at a plurality of adhesion portions which are spaced apart in the axial direction, said plurality of adhesion points including a most trailing adhesion portion having greater adhesion strength than any other of said adhesion portions, said method comprising the steps of:

forming a plurality of stepped portions in said lead end of said bottom cap, side by side in a radial direction of said bottom cap to define a plurality of lead end faces at axially different positions;

forming a plurality of stepped portions in a bottom end of said hollow casing, side by side in a radial direction of said hollow casing to define a plurality of bottom end faces at axially different positions, said plurality of bottom end faces of said hollow casing corresponding to said plurality of lead end faces of said bottom cap respectively; and adhering at least two of each of said plurality of corresponding bottom end and lead end faces by means of ultrasonic adhesion, such that the most trailing adhesion portion has greater adhesion strength than any other of said adhesion portions.

21. The method of claim 20, wherein a most trailing lead end face has a greater area than any other of said lead end faces, and a most trailing bottom end face has a greater area than any other of said bottom end faces.

22. The method of claim 20, wherein each said lead end face has a flat surface, and each said bottom end face has a projection extending in the axial direction, said projection of a most trailing bottom end face being longer than said projection of any other of said bottom end faces.

23. The method of claim 20, wherein the most trailing lead end face has a recess for receiving a projection, at least one other of said lead end faces has a flat surface, and each of said bottom end faces has a projection extending in the axial direction, the projection of a most trailing bottom end face extending into said recess formed in said most trailing lead end face of the bottom cap.

24. The method of claim 20, wherein each of said plurality of lead end faces has a flat surface while each of said plurality of bottom end faces has a projection extending in the axial direction.

* * * * *